US010642676B2

(12) United States Patent
Kirshenbaum et al.

(10) Patent No.: US 10,642,676 B2
(45) Date of Patent: May 5, 2020

(54) SCALABLE AUTOMATED DETECTION OF FUNCTIONAL BEHAVIOR

(71) Applicant: Microsoft Technology Licensing, LLC, Redmond, WA (US)

(72) Inventors: Alexander Kirshenbaum, Bellevue, WA (US); Aaron Edward Dietrich, Kirkland, WA (US); Sarah J. D'Onofrio, Mercer Island, WA (US); Lena Berg, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 15/592,870

(22) Filed: May 11, 2017

(65) Prior Publication Data

US 2018/0329767 A1 Nov. 15, 2018

(51) Int. Cl.
*G06F 11/30* (2006.01)
*G06F 11/07* (2006.01)

(52) U.S. Cl.
CPC ........ *G06F 11/079* (2013.01); *G06F 11/0778* (2013.01)

(58) Field of Classification Search
CPC .... G06F 11/079; G06F 9/542; G06F 11/0751; G06F 11/0778; G06F 11/0793
USPC .......................................................... 714/37
See application file for complete search history.

(56) References Cited

U.S. PATENT DOCUMENTS

| 6,738,933 B2 | 5/2004 | Fraenkel et al. |
| 7,434,109 B1 * | 10/2008 | Stabile ................ H04L 41/0681 709/223 |
| 8,191,042 B2 | 5/2012 | Pinto et al. |
| 8,468,391 B2 | 6/2013 | Balani et al. |
| 8,661,299 B1 | 2/2014 | Ip |
| 8,850,172 B2 | 9/2014 | Dietrich et al. |
| 10,228,988 B2 * | 3/2019 | Craik .................. G06F 11/0706 |

(Continued)

OTHER PUBLICATIONS

Sandeep, et al., "Cluebox: A Performance Log Analyzer for Automated Troubleshooting", In Proceedings of First USENIX Workshop on the Analysis of System Logs, Dec. 7, 2008, 12 pages.

(Continued)

*Primary Examiner* — Chae M Ko
(74) *Attorney, Agent, or Firm* — Liang IP, PLLC (57) ABSTRACT

A behavior detection system has access to a collection of behavior definitions that each describe a functional behavior of a system. Each behavior definition includes multiple basic operations, each of which includes an identifier and one or more parameters. The behavior definition also includes, explicitly or inherently, a basic operation combination definition that describes a sequence or other manner in which the basic operations are combined. The behavior detection system analyzes events in an event log for the system and determines whether the events in the event log satisfy any of the behavior definitions. An appropriate responsive action is taken in response to detecting that the events in the event log satisfy a behavior definition. The collection of behavior definitions is scalable, allowing behavior definitions to be added or deleted, and allowing basic operations in a behavior definition to be changed (e.g., adding, removing, and/or modifying basic operation parameters).

20 Claims, 7 Drawing Sheets

(56) References Cited

U.S. PATENT DOCUMENTS

| | | | |
|---|---|---|---|
| 2010/0223499 A1* | 9/2010 | Panigrahy | G06F 11/0709 |
| | | | 714/19 |
| 2011/0227925 A1* | 9/2011 | De Pauw | G06F 11/323 |
| | | | 345/440 |
| 2011/0283239 A1 | 11/2011 | Krishnan et al. | |
| 2012/0124363 A1* | 5/2012 | Dietrich | G06F 11/3442 |
| | | | 713/100 |
| 2012/0210429 A1* | 8/2012 | Stute | C12Q 1/6804 |
| | | | 726/23 |
| 2014/0032977 A1* | 1/2014 | Myrah | G06F 11/3419 |
| | | | 714/47.2 |
| 2014/0282426 A1 | 9/2014 | Kirshenbaum et al. | |
| 2016/0132372 A1 | 5/2016 | Anderson et al. | |
| 2016/0148103 A1 | 5/2016 | Sarrafzadeh et al. | |

OTHER PUBLICATIONS

Kim, et al., "Autonomic fault management based on cognitive control loops", In Proceedings of IEEE/IFIP 4th Workshop on Management of the Future Internet, Apr. 16, 2012, pp. 1104-1110.
Furman, Roy, "Declarative Strategies for Solving Software Problems", https://web.archive.org/web/20160629124922/http:/sstnet.com/Article2/default.aspx, Published on: Jun. 29, 2016, 3 pages.

* cited by examiner

SCALABLE AUTOMATED DETECTION OF FUNCTIONAL BEHAVIOR

BACKGROUND

As computing technology has advanced, computing devices have become increasingly complex. Over any given time frame, multiple different processes and threads can be running in these computing devices, and may number on the order of hundreds, thousands, or more. Many of these different processes and threads are performing similar operations, such as storage device input/output (I/O), network data transfers, system resource accesses, and so forth. Given the large number of processes and threads that are performing similar operations, it can be difficult to detect the cause of performance issues or other problems in the computing devices. This can lead to poor computing device operation, which can lead to user dissatisfaction with their computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a behavior definition for a behavior of a system is obtained. The behavior definition includes a set of multiple basic operations, each of the multiple basic operations including one or more parameters. A log of events that occur in the system is accessed. The log of events is analyzed to determine whether the one or more parameters of each of the multiple basic operations of the behavior definition have been satisfied, and an indication is provided that the behavior has occurred in response to the one or more parameters of each of the multiple operations being satisfied.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Scalable automated detection of functional behaviors is discussed herein. A behavior detection system has access to a collection of behavior definitions that each describe a functional behavior of the system. The behavior detection system can obtain the behavior definitions from various sources, and can optionally facilitate generation of the behavior definitions. Each behavior definition includes a set of multiple basic operations, each of which includes a basic operation identifier and one or more basic operation parameters. The behavior definition also includes, explicitly or inherently, a basic operation combination definition that describes a sequence or other manner in which the basic operations are combined. The behavior definition can also include one or more other behavior definitions.

The basic operations refer to operations performed in a system, such as data storage device I/O, network I/O, memory accesses, and so forth. A basic operation parameter refers to a parameter of such an operation, such as the name of a process that requested or performed the operation, a command sent as part of the operation, a target (e.g., network address) of the operation, and so forth. The basic operation combination description can indicate that the basic operations are to be performed in a particular sequence and/or use various different combinatorial logic to combine basic operations.

The behavior detection system also has access to an event log for a system. The event log is a record of events that occur in the system, such as inter-process calls, file I/O activity, system calls, network calls, and so forth. The behavior detection system analyzes the events in the event log and determines whether the events in the event log satisfy any of the behavior definitions. In response to detecting that the events in the event log satisfy a behavior definition, the behavior detection system takes an appropriate responsive action. Various different responsive actions can be taken, such as notifying an administrator or user of the system, logging or otherwise storing a record that the behavior definition was satisfied, and so forth.

The behavior detection system is a scalable system that is able to detect a wide range of behaviors. The collection of behavior definitions is easily scalable in that the behavior definitions can be expanded to add new behavior definitions and/or contracted to delete behavior definitions as desired over time. The behavior definitions can further be modified over time and during operation of the system, changing the basic operations in a behavior definition (e.g., adding, removing, and/or modifying basic operation parameters), changing the basic operation combination definition, and so forth.

The techniques discussed herein allow various different functional behaviors in the system to be described using a combination of various different basic operations. The system is monitored to detect when those functional behaviors occur, and take appropriate responsive action. The behavior definitions can be used to defined functional behaviors that are deemed problematic (e.g., contribute to poor performance (such as slow operation) of the system, contribute to poor energy usage, etc.).

Figure 1:
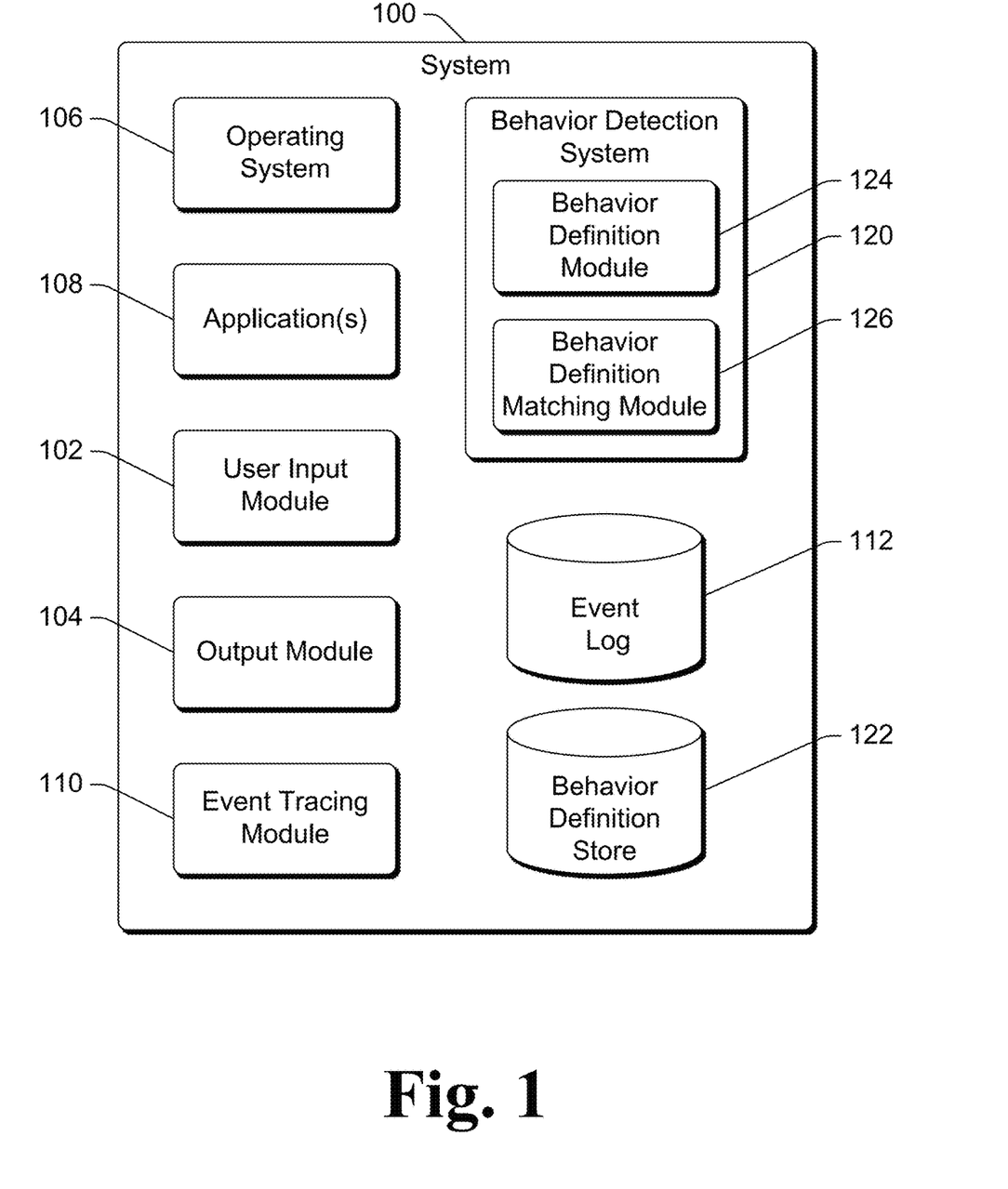
FIG. 1 illustrates an example system implementing the scalable automated detection of functional behaviors in accordance with one or more embodiments.

FIG. 1 illustrates an example system 100 implementing the scalable automated detection of functional behaviors in accordance with one or more embodiments. The system 100 can be implemented by one or more computing devices. A computing device implementing the system 100 can be a variety of different types of devices, such as a physical device or a virtual device. For example, a computing device implementing the system 100 can be a physical device such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality (AR) devices, virtual reality (VR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. A computing device implementing the system 100 can also be a virtual device, such as a virtual machine running on a physical device. A virtual machine can be run on any of a variety of different types of physical devices (e.g., any of the various types listed above). Thus, computing devices implementing the system 100 may range from full resource devices with substantial memory and processor resources (e.g., personal computers, game consoles) to low-resource devices with limited memory and/or processing resources (e.g., traditional set-top boxes, handheld game consoles).

In one or more embodiments, the system 100 is implemented as a service that is run on one or more computing devices. Such a service can be, for example, a service hosted in the cloud. In such embodiments, the techniques discussed herein are used to detect functional behaviors in the service rather than in a specific computing device.

The system 100 includes a user input module 102 and an output module 104. The user input module 102 receives user inputs from a user of the system 100. User inputs can be provided in a variety of different manners, such as by pressing one or more keys of a keypad or keyboard of the system 100, pressing one or more keys of a controller (e.g., remote control device, mouse, track pad, etc.) of the system 100, pressing a particular portion of a touchpad or touchscreen of the system 100, making a particular gesture on a touchpad or touchscreen of the system 100, and/or making a particular gesture on a controller (e.g., remote control device, mouse, track pad, etc.) of the system 100. User inputs can also be provided via other physical feedback input to the system 100, such as tapping any portion of a computing device implementing the system 100, an action that can be recognized by a motion detection or other component of the system 100 (such as shaking a computing device implementing the system 100, rotating a computing device implementing the system 100, bending or flexing a computing device implementing the system 100, etc.), and so forth. User inputs can also be provided in other manners, such as via voice or other audible inputs to a microphone, via motions of hands or other body parts observed by an image capture device, and so forth.

The output module 104 generates, manages, and/or outputs content for display, playback, and/or other presentation. This content can be created by the output module 104 or obtained from other modules of the system 100. This content can be, for example, a display or playback portion of a user interface (UI). The content can be displayed or otherwise played back by components of a computing device implementing the system 100 (e.g., speakers, interactive display devices, etc.). Alternatively, the output module 104 can generate one or more signals that are output to other devices or components (e.g., speakers, display devices, etc.) that are separate from a computing device implementing the system 100.

The system 100 also includes an operating system 106 and one or more applications 108. The operating system 106 includes one or more programs or modules that manage various aspects of the system 100, allow applications 108 to run, and so forth. Although the user input module 102 and the output module 104 are illustrated separately from the operating system 106, it should be noted that the operating system 106 can optionally include the user input module 102 and the output module 104.

The applications 108 are various different programs that can be run by the operating system 106. The applications can be any of a variety of different application programs, such as utility programs, educational programs, entertainment programs, productivity programs, and so forth.

The system 100 also includes an event tracing module 110. The applications 108 as well as the programs of the operating system 106 are run as one or more processes on the system 100. These processes perform various tasks, which are logged by the event tracing module in an event log 112. The event log 112 can be any of a variety of different storage devices, such as a magnetic disk, optical disc, Flash memory, random access memory (RAM), and so forth.

The event tracing module 110 logs various different data (also referred to as metadata) regarding events that occur in the system 100. These events refer to various calls made by a process in the system 100 or other events in the system 100 (e.g., changes in whether a desktop is displayed, changes in which window is displayed, changes in power state (e.g., whether the system 100 is operating in a battery save mode), and so forth). For example, the event tracing module 110 can log data regarding inter-process calls in the system 100, file I/O access by a process in the system 100, calls by a process to the operating system 106, network access by a process in the system 100, and so forth. Various data regarding the calls or events can be logged, such as a timestamp (e.g., date and time) of when the call was made or the event occurred, an identifier of the process that made the call, what the response was (if any) that the process received to the call, what the target of the call was (e.g., an identifier of another process, an identifier of a file, an identifier of a network address (e.g., an Internet protocol (IP) address), and so forth). Although illustrated as separate from the operating system 106, the event tracing module 110 can optionally be part of the operating system 106.

The event tracing module 110 can be implemented in a variety of different manners. For example, the event tracing module 110 can be the Event Tracing for Windows (ETW) service or an analogous service. By way of another example, the event tracing module 110 can be a module or system that provides performance counters' values, telemetry data, and so forth.

The system 100 also includes a behavior detection system 120 and a behavior definition store 122. The behavior detection system 120 maintains the behavior definitions in the behavior definition store 122 and determines when the events in the event log 112 satisfy a behavior definition as discussed in more detail below.

The behavior definition store 122 stores one or more behavior definitions. The behavior definition store 122 can be any of a variety of different storage devices, such as a magnetic disk, optical disc, Flash memory, RAM, and so forth. Each behavior definition is described using a declarative that includes one or more basic operations. Each basic operation typically includes one or more basic operation parameters, although in some situations a basic operation may include no basic operation parameters.

The basic operations refer to operations performed in a system. Various different types of basic operations can be performed in a system. For example, basic operations can include user inputs (e.g., button clicks, gestures on a touchscreen, voice inputs, etc.). By way of another example, basic operations can include data storage device I/O (e.g., file open, file close, file I/O (e.g., write/read), waiting on storage device, etc.). By way of yet another example, basic operations can include network I/O (e.g., a remote procedure call (RPC), network connection establishment, waiting on network, network timeout, etc.). By way of yet another example, basic operations can include memory accesses (e.g., memory I/O (memory write/read), allocating memory, waiting on a lock, etc.). By way of yet another example, basic operations can include inter-process communication (e.g., process request, process response, waiting on process, etc.). By way of yet another example, basic operations can include data presentation (e.g., desktop displayed, lock screen displayed, audible warning or notification playback, etc.). By way of yet another example, basic operations can include process operations (e.g., launching a process, terminating a process, etc.).

The basic operations correspond to calls made by a process or other events in the system 100 for which data is stored in the event log 112. Thus, for example, a basic operation may be one process calling another process, and data in the event log 112 indicates when such an inter-process call occurs.

A basic operation parameter refers to a parameter of a basic operation, and can vary based on the particular basic operation. For example, the basic operation parameter can be the identifier (e.g., name) of a process that requested or performed the operation (e.g., the process that receives a user input, the process that performs data storage device I/O, the process that performs network I/O, and so forth). By way of another example, the basic operation can be target of the operation (e.g., a file name, an identifier (e.g., name) of another process, a network address (e.g., IP address), and so forth).

Basic operation parameters can also include various other information or metadata regarding the basic operation. For example, the basic operation parameters can include the name of a command sent, the code or name of a response received, a size of a data transfer, an offset on a storage device, and so forth. By way of another example, the basic operation parameters can include a timing parameter or value indicating how long the basic operation is expected to occur or how long is acceptable (e.g., to an administrator, to a system designer, etc.).

Figure 2:
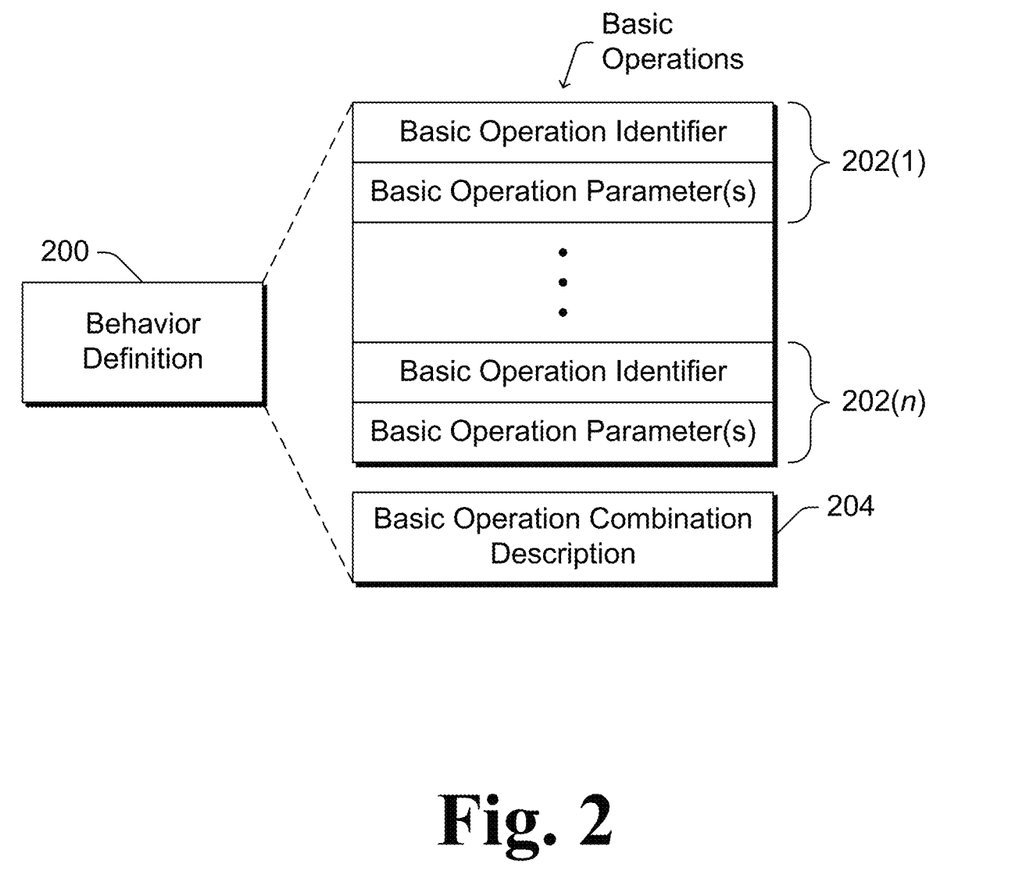
FIG. 2 illustrates an example behavior definition in accordance with one or more embodiments.

FIG. 2 illustrates an example behavior definition 200 in accordance with one or more embodiments. Generally, a behavior definition includes a set of multiple basic operation parameters that are combined in some manner. In the illustrated example of FIG. 2, the behavior definition 200 includes multiple (n) basic operations 202(1), . . . , 202(n). Each basic operation 202 includes a basic operation identifier and one or more basic operation parameters. The basic operation identifier is an identifier of a particular basic operation and is used to distinguish different basic operations from one another. In one or more embodiments, the basic operation identifier is an basic operation definition or name that describes what the basic operation is. The basic operation parameters are one or more basic operation parameters for the basic operation. Various different basic operation parameters can be included as discussed above.

The behavior definition also includes a basic operation combination description that describes how the basic operations in the behavior definition 200 are combined. In the illustrated example, the behavior definition 200 includes a basic operation combination description 204. The basic operation combination description is an explicit description of how the basic operations are combined. The basic operations can be combined in any of a variety of different manners, such as by a particular sequence (e.g., an order in which the basic operations occur) and/or various other combinatorial logic (e.g., logical AND operations, logical OR operations, logical exclusive-OR (XOR) operations, and so forth). Furthermore, how the basic operations are combined can be based on the basic operation parameters, using any of a variety of combinatorial logic. For example, one basic operation may be for a file open operation and another basic operation may be for a file read operation, and the basic operation parameters for these two basic operations to not specify a particular file that is opened and read, but the basic operation combination description 204 specifies that the file is the same file.

Additionally or alternatively, the basic operation combination description can be inherent in the behavior definition 200, in which case the basic operation combination description 204 need not be combined. For example, the order in which the basic operations are stored in or occur in the behavior definition 200 is the sequence in which the basic operations occur.

It should be noted that a behavior definition can also include one or more other behavior definitions. For example, in addition to at least one basic operation 202, the behavior definition can include an additional behavior definition. This additional behavior definition itself includes one or more basic operations (and optionally one or more additional behavior definitions). Thus, a behavior definition can be used as a building block for, and included as part of, another behavior definition.

Figure 3:
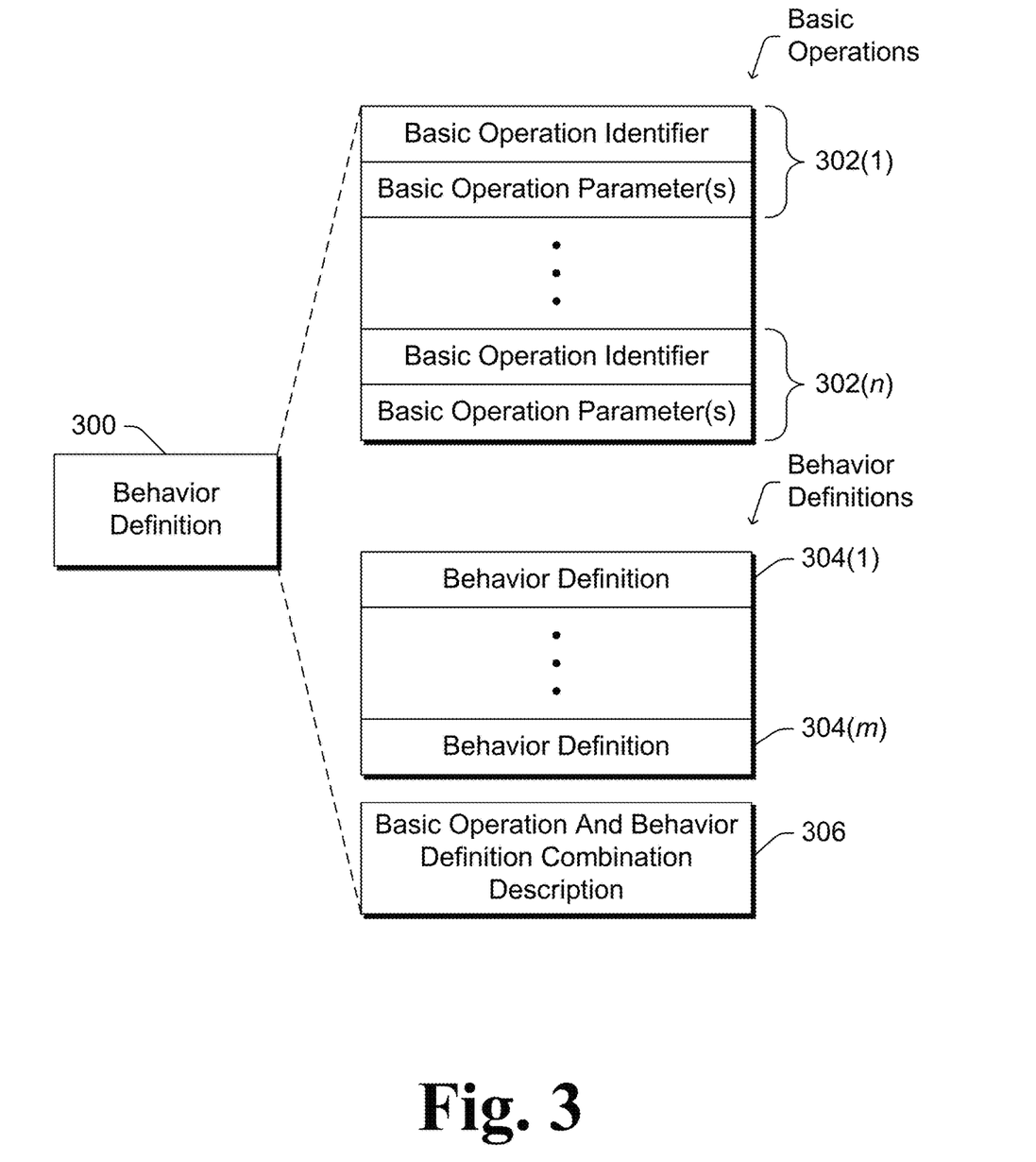
FIG. 3 illustrates another example behavior definition in accordance with one or more embodiments.

FIG. 3 illustrates an example behavior definition 300 in accordance with one or more embodiments. Behavior definition 300 is similar to behavior definition 200 of FIG. 2, but also includes another behavior definition. In the illustrated example of FIG. 3, the behavior definition 300 includes multiple (n) basic operations 302(1), . . . , 302(n). Each basic operation 302 includes a basic operation identifier and one or more basic operation parameters as discussed above. The behavior definition 300 also includes multiple (m) behavior definitions 304(1), . . . , 304(m). Each behavior definition 304 includes one or more basic operations analogous to basic operations 302 and/or basic operations 202. Each behavior definition 304 can also optionally include one or more behavior definitions (e.g., analogous to behavior definition 300).

The behavior definition 300 also includes a basic operation and behavior definition combination description that describes how the basic operations and/or behavior definitions in the behavior definition 300 are combined. In the illustrated example, the behavior definition 300 includes a basic operation and behavior definition combination description 306, which is an explicit description of how the basic operations 302 and/or behavior definitions 304 are combined. The basic operations 302 and/or behavior definitions 304 can be combined in any of a variety of different manners, such as by a particular sequence (e.g., an order in which the basic operations occur) and/or various other combinatorial logic (e.g., logical AND operations, logical OR operations, logical exclusive-OR (XOR) operations, and so forth). Additionally or alternatively, the basic operation and behavior definition combination description can be inherent in the behavior definition 300, in which case the basic operation combination description 306 need not be combined.

Figure 4A:
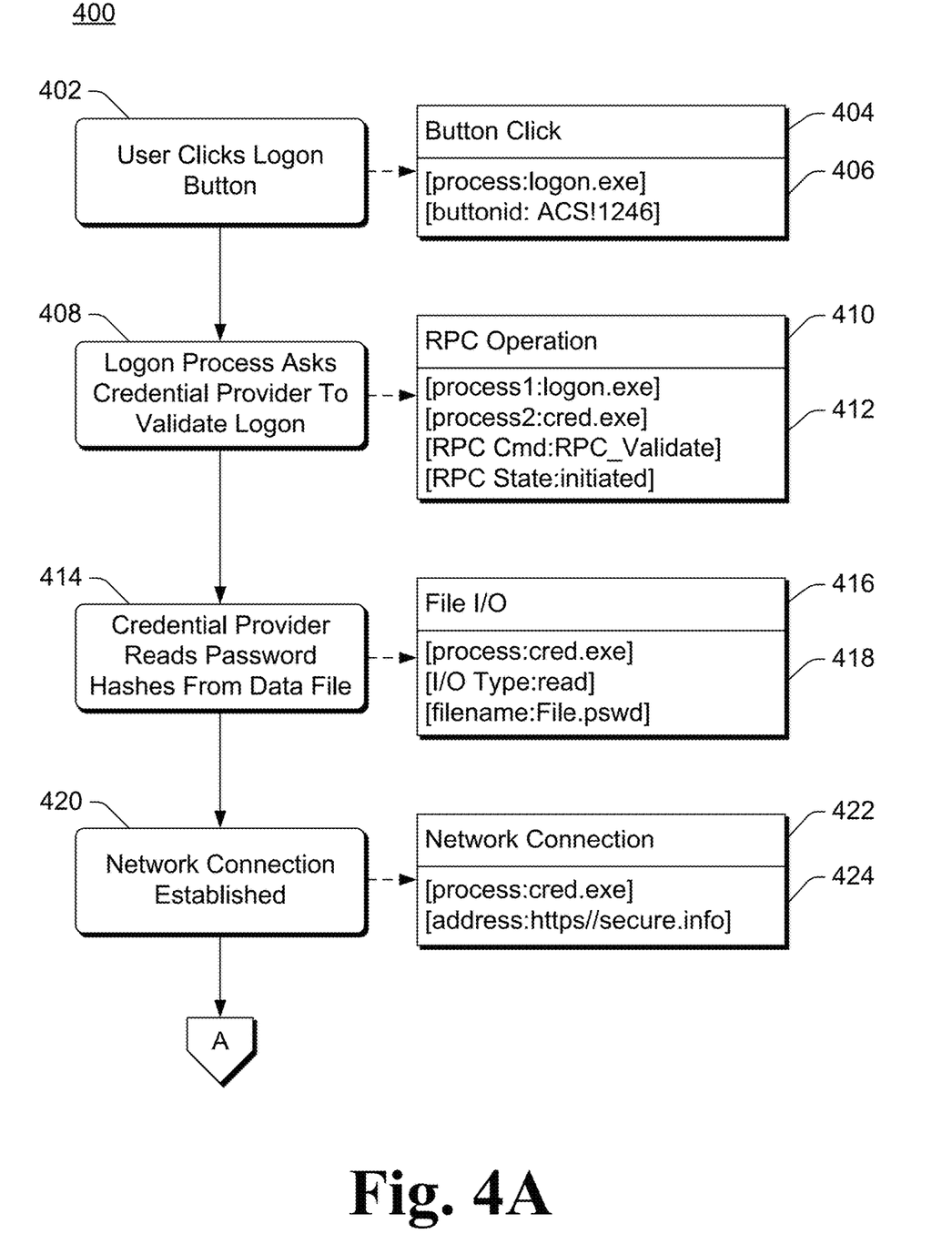
FIGS. 4A and 4B illustrate an example behavior definition for a user logon behavior in accordance with one or more embodiments.
Figure 4B:
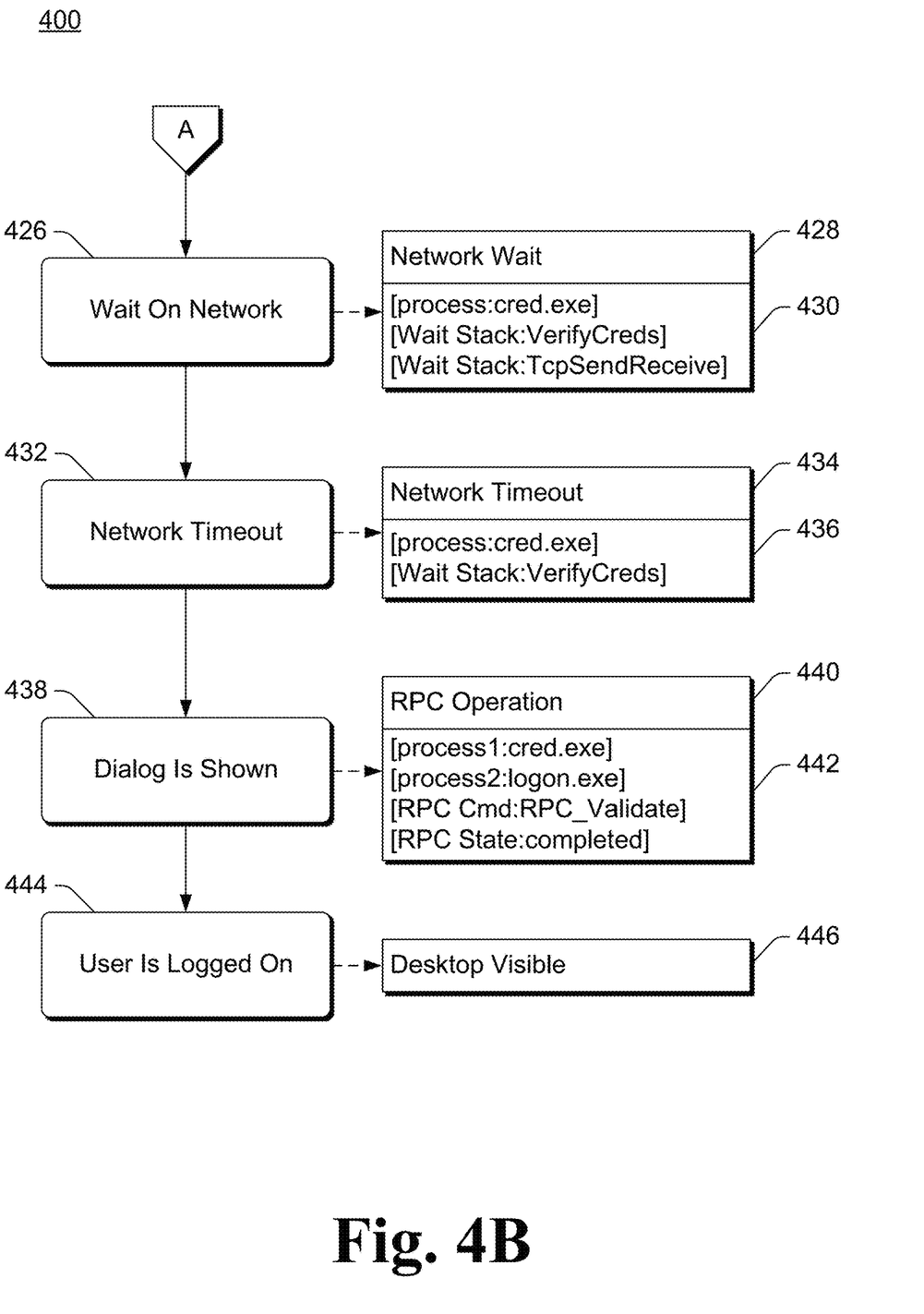

FIGS. 4A and 4B illustrate an example behavior definition for a user logon behavior in accordance with one or more embodiments. A sequence of actions performed for a user login to a system is shown on the left-hand side of FIGS. 4A and 4B, and the behavior definition for the user login behavior is shown on the right-hand side of FIGS. 4A and 4B. The user logon behavior shown in FIGS. 4A and 4B is for behavior that is a problem or issue, such as a delay in user logon due to a credential provider communicating with another service over a network.

The user logon behavior begins with a user clicking a logon button, shown at act 402. A basic operation corresponding to act 402 includes a basic operation identifier 404 indicating a button click, and one or more basic operation parameters 406. The basic operation parameters 406 include an identifier of a process that receives the button click (shown as logon.exe) and an identifier of a particular button (shown as ACS!1246).

In response to the logon button being clicked, the logon process (logon.exe) asks a credential provider to validate the logon, shown as act 408. A basic operation corresponding to act 408 includes a basic operation identifier 410 indicating a remote procedure call (RPC) operation, and one or more basic operation parameters 412. The basic operation parameters 412 include an identifier of a process that makes the RPC call (shown as logon.exe), a target process of the RPC call (shown as cred.exe), a command or request being made as part of the RPC call indicating that a validation request is being made (shown as RPC_Validate), and a current state of the RPC call indicating that the RPC call has been initiated (shown as initiated).

Next in the user logon behavior, the credential provider reads password hashes from a data file, shown as act 414. A basic operation corresponding to act 414 includes a basic operation identifier 416 indicating a file I/O operation, and one or more basic operation parameters 418. The basic operation parameters 418 include an identifier of a process that performs the file I/O operation (shown as cred.exe), a type of file I/O (shown as read), and an identifier of the file being read (shown as File.pswd).

Next in the user logon behavior, the credential provider establishes a network connection to a credential verification service, shown as act 420. A basic operation corresponding to act 420 includes a basic operation identifier 422 indicating a network connection event, and one or more basic operation parameters 424. The basic operation parameters 418 include an identifier of a process that performs the file I/O operation (shown as cred.exe), a type of file I/O (shown as read), and an identifier of the file being read (shown as File.pswd).

Next in the user logon behavior, the credential provider waits for a response over the network, shown as act 426. A basic operation corresponding to act 426 includes a basic operation identifier 428 indicating a network wait operation, and one or more basic operation parameters 430. The basic operation parameters 430 include an identifier of a process that performs the network wait operation (shown as cred.exe), as well as data pushed on a wait stack (shown as Verify Creds and TcpSendReceive).

Next in the user logon behavior, the network connection times out, shown as act 432. A basic operation corresponding to act 432 includes a basic operation identifier 434 indicating a network timeout event, and one or more basic operation parameters 436. The basic operation parameters 436 include an identifier of a process that is waiting for the network when the network timeout occurs (shown as cred.exe), as well as data pushed on a wait stack (shown as Verify Creds).

Next in the user logon behavior, a dialog box is displayed indicating the credentials were validated and the logon was successful, shown as act 438. A basic operation corresponding to act 438 includes a basic operation identifier 440 indicating an RPC operation, and one or more basic operation parameters 442. The basic operation parameters 442 include an identifier of a process that makes the RPC call (shown as cred.exe), a target process of the RPC call (shown as logon.exe), a response being returned as part of the RPC call indicating that the logon was validated (shown as RPC_Validate), and a current state of the RPC call indicating that the RPC call has been completed (shown as completed).

Next in the user logon behavior, the user is logged on, shown as act 444. A basic operation corresponding to act 444 includes a basic operation identifier 446 indicating a desktop visible event. The basic operation corresponding to act 444 has not basic operation parameters.

Using the behavior definition illustrated in FIGS. 4A and 4B, the behavior detection system 120 can automatically detect when there is a delay in the logon process due to a network timeout when verifying credentials. If the events in the event log satisfy the basic operations shown in FIGS. 4A and 4B (including the events occurring in the order of the basic operations displayed in FIGS. 4A and 4B) then an appropriate responsive action is taken as discussed in more detail below.

Returning to FIG. 1, the system 100 includes a behavior detection system 120. The behavior detection system 120 includes a behavior definition module 124 and a behavior definition matching module 126. The behavior definition module 124 facilitates generating behavior definitions. In one or more embodiments, the behavior definition module 124 exposes a user interface allowing a user of the system 100 to input data for basic operations (e.g., the basic operation identifier and the basic operation parameters) and to define or modify a behavior definition (e.g., add basic operations to the behavior definition, remove basic operations from the behavior definition, modify the basic operation parameters of a basic operation in the behavior definition). The user interface can optionally be a graphical user interface (GUI). Such a GUI can, for example, allow a user to drag and drop graphical representations (e.g., icons) of basic operations onto graphical representations (e.g., icons) of behavior definitions in order to add basic operations to a behavior definition, drag and drop graphical representations (e.g., icons) of basic operations away from a collection of behavior definitions in order to remove basic operations from a behavior definition, tap on a graphical representation (e.g., icon) of a basic operation to open a data entry box allowing the user to updated the basic operation identifier and/or basic operation parameters), and so forth.

The behavior definition module 124 stores newly created behavior definitions in the behavior definition store 122. Similarly, the behavior definition module 124 stores changes requested by a user to behavior definitions in the behavior definition store 122, and removes from the behavior definition store 122 behavior definitions that a user requests to be deleted.

The behavior definition matching module 126 analyzes the data in the event log 112 and determines, for each behavior definition in the behavior definition store 122, whether the behavior described in the behavior definition has occurred. The behavior definition matching module 126 can use any of a variety of different public and/or proprietary techniques to perform this analysis. Generally, the behavior definition matching module 126 checks, for any given behavior definition, whether the data in the event log 112 indicates that events in the system 100 have occurred that satisfy or match the basic operations in the behavior definition. In response to determining that the data in the event log 112 indicates that events in the system 100 have occurred that match the basic operations in a behavior definition, the behavior definition matching module 126 determines that the behavior described by that behavior definition has occurred.

The behavior definition matching module 126 can take any of a variety of appropriate responsive actions in response to determining that the behavior described by that behavior definition has occurred. For example, these responsive actions can include logging events (e.g., storing an indication that the behavior described by the behavior definition has occurred in a storage device of the system 100, sending a communication (e.g., an email or other message) to a remote system to store or record an indication that the behavior described by the behavior definition has occurred). By way of another example, these responsive actions can include notification events, such as sending a communication (e.g., an email or other message) to a user or administrator of the system 100, presenting (e.g., displaying, playing back audibly) a notification that the behavior described by the behavior definition has occurred, and so forth.

In one or more embodiments, a behavior definition is created that has basic operations with one or more basic operation parameters that indicate a problem or issue in the system 100. This allows a user to create a behavior definition the describes a problem or issue in the system 100, and have the behavior detection system 120 detect when the problem or issue occurs and alert the user to the occurrence of the problem or issue. For example, a user may consider it a problem or issue in the system 100 if verification of a value from a remote service takes longer than a threshold amount of time (e.g., 1 second). A behavior definition can be created that includes a basic operation of requesting verification of a value from a remote service accessed via a network I/O, and a parameter of that basic operation can be a timing parameter indicating the threshold amount of time. If the basic operation takes at least (or greater than) the threshold amount of time, and the remaining parameters of the remaining basic operations in the behavior definition are satisfied, then the behavior definition matching module 126 determines that the events in the event log 112 satisfy the behavior definition. An appropriate responsive action can then be taken (e.g., notifying the user that the defined behavior has occurred, thus alerting the user that verification of a value from the remote service took longer than the threshold amount of time).

In addition to threshold amounts of time, other threshold values can be used as basic operation parameters. For example, the threshold values could be operation count, number of bytes by an operation (e.g., for an I/O operations), and so forth.

By way of another example, a user may consider it a problem or issue in the system 100 if, in response to a request to verify a value, a process returns an indication of "Error". A behavior definition can be created that includes a basic operation of requesting verification of a value from a process, and combinatorial logic used to indicate that that basic operation is logically AND'd with multiple other basic operations. If the basic operation is performed and the process returns an indication of "Error", then the behavior definition matching module 126 determines that the events in the event log 112 satisfy the behavior definition. An appropriate responsive action can then be taken (e.g., notifying the user that the defined behavior has occurred, thus alerting the user that verification of a value from the process resulted in an indication of "Error").

In one or more embodiments, in response to the events in the event log satisfying a behavior definition, the behavior definition matching module 126 stores a record of the behavior definition being satisfied. This record can be stored in any of a variety of different storage devices, analogous to the storage device used to implement the behavior definition store 122. The behavior definition matching module 126 also stores in this record the data from the event log 112 (or alternatively pointers to data in the event log 112) for the events that caused the behavior definition to be satisfied. The events that cause a behavior definition to be satisfied can have various additional information stored in the event log 112 in addition to any data that is used to determine satisfaction of behavior definition. For example, a timestamp can be stored, data identifying the calling process can be stored, and so forth.

In one or more embodiments, situations can arise where multiple sets of events in the event log satisfy a behavior definition. In such situations, the behavior detection system 120 can display a list or other visual representation of each set of events in the event log that satisfy the behavior definition. This display can include displaying various properties of the events and the corresponding data from the event log (e.g., a timestamp for when the event occurred, an identifier of a process making an inter-process call or performing an operation, an identifier of a target of an operation, etc.). User input can be received allowing the user to sort based on any of the properties of the events.

For example, assume that a behavior definition is satisfied by hundreds of different sets of events, and that the behavior definition does not specify which process is making an inter-process call. However, the data displayed for the sets of events can include an identifier of the process that is making the inter-process call. A user input selecting the process of that is making the inter-process call can be received, and the display of the sets of events adjusted based on the identifiers of the processes making the inter-process call. This adjustment can be sorting based on the identifiers of the processes making the inter-process call, filtering based on the identifiers of the processes making the inter-process call (e.g., so that only the sets of events that include a user-selected process(es) making the inter-process call are displayed), and so forth.

By way of another example, assume that a behavior definition is satisfied by hundreds of different sets of events over a given time range (e.g., an 8-hour period). A user input selecting a sub-range of the given time range (e.g., a particular 30-minute time period) can be received, and the display of the sets of events adjusted based on the timestamps of the events in the different sets of events. This adjustment can be, for example, filtering based on the timestamps so that only the sets of events that include events within the user selected sub-range (e.g., all events in the set of events are within the user selected sub-range) are displayed.

In one or more embodiments, information from one behavior definition that the behavior detection system 120 detects as being satisfied is used to create a new behavior definition. This allows a user to create a behavior definition that identifies particular information, and then create another behavior definition that uses that identified information. By way of example, a user can create a behavior definition that generally says "identify things that happen on a path between A and B", and the results of that behavior definition are used in a new behavior definition. More specifically, a user can create a behavior definition that says "identify the value of the 'process name' parameter in calls that exceed a threshold amount of time (e.g., 3 seconds) between a 'logonui' basic operation and a 'creds.dll' basic operation". The behavior detection system 120 identifies the name(s) of the process(es) in calls that exceed the threshold amount of time between the 'logonui' basic operation and the 'creds.dll' basic operation and the name(s) of those process(es) can then be used in another behavior definition.

The techniques discussed herein provide a dynamic, scalable system that allow various behaviors to be detected. A user of the system 100 can define, via the behavior detection system 120, one or more behaviors that he or she desires to have detected. These behaviors can be behaviors that the user deems to be a problem or issue, such as some sequence of operations that may take too long and lead to poor system performance, running of one or more programs at an inopportune time (such as when the system 100 is running in a low power mode) that may lead to poor power usage, accessing of one or more files at an inopportune time (such as when the system 100 is running in a low power mode) that may lead to poor power usage, and so forth.

It should be noted that a variety of different behaviors can be detected using the techniques discussed herein, and the behaviors need not be associated with problems or issues. For example, a user may simply desire to know how frequently a particular sequence of operations occurs. Based on this frequency the user can take various actions, such as modified components or modules so that the sequence of operations occurs more quickly (e.g., thus improving performance of the system 100) or occurs more slowly (e.g., using lower cost components that reduce the cost of the system 100 but reduce performance for a sequence of operations that occurs very infrequently). By way of another example, a user may desire to know when behaviors that he or she deems to be good or desirable occur.

Additionally, the user can refine behavior definitions as desired over time, broadening the behavior definition by removing basic operations and/or basic operation parameters, and/or narrowing the behavior definition by adding basic operations and/or basic operation parameters. For example, the behavior definition illustrated in FIGS. 4A and 4B allows the behavior detection system 120 to automatically detect when there is a delay in the logon process due to a network timeout when verifying credentials using a particular process (shown as cred.exe). It may be that other processes can also verify credentials, although delays in the logon process due to a network timeout for such other processes would not be detected using the behavior definition illustrated in FIGS. 4A and 4B because the basic operation parameters identify the process as being cred.exe. A user could modify the behavior definition illustrated in FIGS. 4A and 4B (or create a new behavior definition) that does not have the basic operation parameters that identify the process as being cred.exe. With such a modified or new behavior definition, delays in the logon process due to a network timeout when verifying credentials using any process would be detected.

The behavior definitions can be implemented in a variety of different manners. In one or more embodiments, the behavior definitions are implemented using an Extensible Markup Language (XML). For example, a basic operation may be defined that is a process A.exe opening a file foo.dat. This basic operation can be defined as:

```
<operation id="foo.dat_openedby_A.exe" type="FileOpen">
  <filename>foo.dat</filename>
  <process>A.exe</process>
  <flags>FILE_SHARE_READ</flags>
</operation>
```

A behavior definition describing a long RPC call from process A to process B (indicating an issue that is a long opening of the file foo.dat by A.exe) can be defined as:

```
<behavior type="'performanceIssue"
    id="longRPC_B.exe_and_A.exe_CreateFileDelay">
  <basicOperations>
    <sequence>
      <operation
       index=
       "1">RPC_QUERY_DETAILS_B.exe_A.exe</operation>
      <operation index="2"
       durationThreshold=
       ">300ms">foo.dat_openedby_A.exe</operation>
    </sequence>
  </basicOperations>
</behavior>
```

Figure 5:
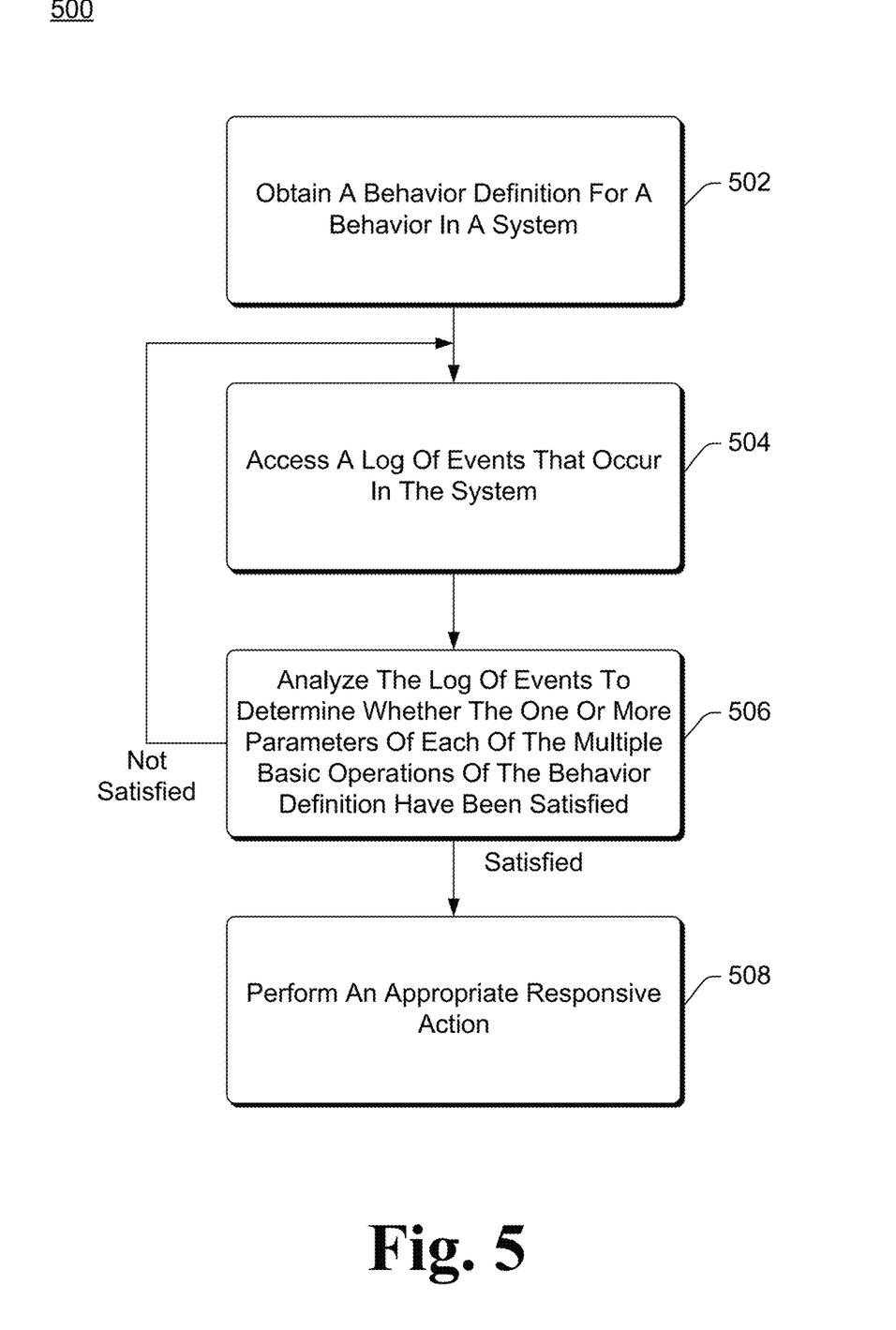
FIG. 5 is a flowchart illustrating an example process for implementing the scalable automated detection of functional behaviors in accordance with one or more embodiments.

FIG. 5 is a flowchart illustrating an example process 500 for implementing the scalable automated detection of functional behaviors in accordance with one or more embodiments. Process 500 is carried out by a system, such as behavior detection system 120 of FIG. 1, and can be implemented in software, firmware, hardware, or combinations thereof. Process 500 is shown as a set of acts and is not limited to the order shown for performing the operations of the various acts. Process 500 is an example process for implementing the scalable automated detection of functional behaviors; additional discussions of implementing the scalable automated detection of functional behaviors are included herein with reference to different figures.

In process 500, a behavior definition for a functional behavior in a system is obtained (act 502). The behavior definition can be obtained from a behavior definition store. The behavior definition can have been added to the behavior definition store in various manners, such as by a user of the system creating the behavior definition, by copying or otherwise transferring the behavior definition from another service or device, and so forth. The behavior definition includes one or more basic operations, each of which can include one or more basic operation parameters. In some situations, a basic operation may include no basic operation parameters.

A log of events that occur in the system is accessed (act 504). The log of events includes data regarding events that occur in the system 100, these events being calls made by a process or other events in the system that can correspond to basic operations in a behavior definition.

The log of events is analyzed to determine whether the one or more parameters of each of the multiple basic operations of the behavior definition have been satisfied (act 506). The behavior definition can also include, explicitly or inherently, a basic operation combination description that indicates a sequence in which the basic operations are to occur and/or other manners in which a combination (e.g., using various combinatorial logic) of the basic operations are to occur in order for the behavior definition to be satisfied.

If the parameters of the basic operations of the behavior definition have not been satisfied, then accessing the log of events (act 504) and analyzing the log of events (act 506) continues. However, if the parameters of the basic operations of the behavior definition have been satisfied, then an appropriate responsive action is performed (act 508). In one or more embodiments, this appropriate responsive action is to display or otherwise provide an indication that the behavior has occurred in the system is. Additionally or alternatively, other appropriate responsive actions can be taken.

The process 500 can be performed at various times. In one or more embodiments, the process 500 is performed at regular or irregular intervals as the system is running. For example, the process 500 may be performed approximately every ten seconds, approximately every five minutes, during periods of low CPU usage, and so forth. The log of events will change as the system runs, so each time the process 500 is performed the log of events is different. Additionally or alternatively, the process 500 may be performed once during the running of the system (e.g., as the system is starting up, as the system is shutting down).

The techniques discussed herein support a variety of different usage scenarios. In one or more embodiments, the techniques discussed herein allow scalable automated detection of various functional behaviors in a physical computing device. This physical computing device can be any of the devices discussed above, such as a smartphone, laptop, IoT device, and so forth. The techniques discussed herein also allow scalable automated detection of various functional behaviors in a larger system composed of multiple physical computing devices, one or more virtual devices, and so forth.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
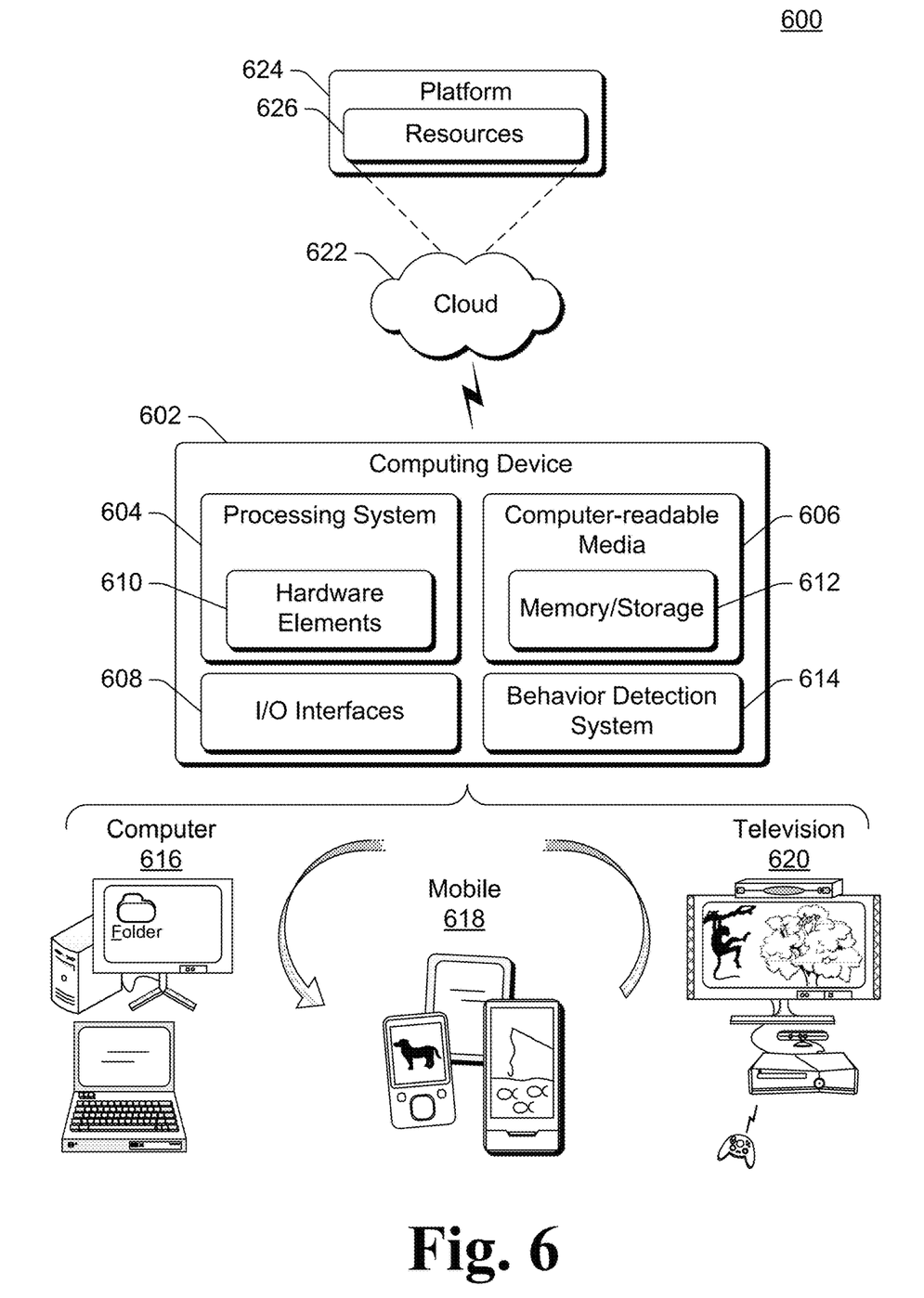
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Resistive RAM (ReRAM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a behavior detection system 614. The behavior detection system 614 provides various functionality to create behavior definitions and automatically detect functional behavior in a system (e.g., in the computing device 602 and/or the system 600), as discussed above. The behavior detection system 614 can implement, for example, the behavior detection system 120 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also optionally be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: obtaining a behavior definition for a behavior of a system, the behavior definition including a set of multiple basic operations, each of the multiple basic operations including one or more parameters; accessing a log of events that occur in the system; analyzing the log of events to determine whether the one or more parameters of each of the multiple basic operations of the behavior definition have been satisfied; and providing an indication that the behavior has occurred in response to the one or more parameters of each of the multiple operations being satisfied.

Alternatively or in addition to any of the above described methods, any one or combination of: each of the basic operations having been defined using a declarative language; the system comprising a computing device or service; the behavior definition further comprising a basic operation combination description that indicates how the multiple basic operations are combined in the behavior definition; the basic operation combination description indicating a sequence in which the multiple basic operations are to occur; the basic operation combination description indicating how the multiple basic operation parameters are to occur using combinatorial logic; the one or more parameters of one basic operation of the multiple basic operations comprising a timing parameter indicating how long the one basic operation is to take, and the timing parameter being satisfied if the basic operation takes longer than the timing parameter indicates; the method further comprising the analyzing including identifying multiple sets of events in the log of events that satisfy the behavior definition, displaying the multiple sets of events that satisfy the behavior definition, the displaying including displaying data for each event in each of the multiple sets of events, receiving a user input identifying displayed data to adjust the displaying of the multiple sets of events, and adjusting the displaying of the multiple sets of events based on the user input; the adjusting the displaying of the multiple events comprising sorting the multiple sets of events; the adjusting the displaying of the multiple events comprising filtering the multiple sets of events.

A system comprising: an event log storing data regarding events that occur in the system; a behavior definition store storing multiple behavior definitions for the system, each of the multiple behavior definitions including a set of multiple basic operations, each of the multiple basic operations including one or more parameters; and a behavior detection system configured to obtain a behavior definition for a behavior of the system, analyze the log of events to determine whether the one or more parameters of each of the multiple basic operations of the behavior definition have been satisfied, and take a responsive action in response to the one or more parameters of each of the multiple operations being satisfied.

Alternatively or in addition to any of the above described systems, any one or combination of: each of the multiple behavior definitions having been defined using a declarative language; each behavior definition further comprising a basic operation combination description that indicates how the multiple basic operations of the behavior definition are combined; the one or more parameters of one basic operation of the multiple basic operations comprising a timing parameter indicating how long the one basic operation is to take, and the timing parameter being satisfied if the basic operation takes longer than the timing parameter indicates; one of the multiple behavior definitions further indicating a sequence in which the multiple basic operations for the behavior definition are to occur.

A computing device comprising: one or more processors; and a computer-readable storage medium having stored thereon multiple instructions that, responsive to execution by the one or more processors, cause the one or more processors to: obtain a behavior definition for a behavior of the computing device, the behavior definition including a set of multiple basic operations, each of the multiple basic operations including one or more parameters; access a log of events that occur in the computing device; analyze the log of events to determine whether the one or more parameters of each of the multiple basic operations of the behavior definition have been satisfied; and provide an indication that the behavior has occurred in response to the one or more parameters of each of the multiple operations being satisfied.

Alternatively or in addition to any of the above described computing devices, any one or combination of: each of the basic operations having been defined using a declarative language; the behavior definition further comprising a basic operation combination description that indicates how the multiple basic operations are combined in the behavior definition; the behavior definition further indicating a sequence in which the multiple basic operations are to occur; the multiple instructions further causing the one or more processors to analyze the log of events by identifying multiple sets of events in the log of events that satisfy the behavior definition, display the multiple sets of events that satisfy the behavior definition, the displaying including displaying data for each event in each of the multiple sets of events, receive a user input identifying displayed data to adjust the displaying of the multiple sets of events, and adjust the displaying of the multiple sets of events based on the user input.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
retrieving data representing a behavior definition for a functional behavior of a computing system, the behavior definition including a set of multiple operations arranged in a sequence, each of the multiple operations including an operation identifier and one or more parameters, wherein one of the multiple operations includes a timing parameter indicating a threshold amount of time corresponding to executing the one of the multiple operations;
accessing data representing a log of events in the computing system, the log of events individually including data representing multiple events each having an event identifier and one or more event parameters; and
analyzing the log of events to determine whether the sequence of the operations and the one or more parameters of each of the multiple operations of the behavior definition have been satisfied, including:
matching one of the multiple events to the one of the multiple operations based on the operation identifier and the event identifier;
determining whether the corresponding event parameter exceeds the threshold amount of time contained in the timing parameter of the one of the multiple operations; and
in response to determining that the sequence is satisfied and the corresponding event parameter exceeds the threshold amount of time contained in the timing parameter of the one of the multiple operations, transmitting, via a computer network, an electronic message to a user indicating that the functional behavior has occurred.

2. The method as recited in claim 1, wherein each of the operations having been defined using a declarative language.

3. The method as recited in claim 1, wherein the computing system comprising a computing device or service.

4. The method as recited in claim 1, wherein the behavior definition further comprising an operation combination description that indicates how the multiple operations are combined in the behavior definition.

5. The method as recited in claim 4, wherein the operation combination description indicating a sequence in which the multiple operations are to occur.

6. The method as recited in claim 4, wherein the operation combination description indicating how the multiple operation parameters are to occur using combinatorial logic.

7. The method as recited in claim 1, wherein the one or more parameters of one operation of the multiple operations comprising a timing parameter indicating how long the one operation is to take, and the timing parameter being satisfied if the operation takes longer than the timing parameter indicates.

8. The method as recited in claim 1, further comprising:
the analyzing including identifying multiple sets of events in the log of events that satisfy the behavior definition;
displaying the multiple sets of events that satisfy the behavior definition, the displaying including displaying data for each event in each of the multiple sets of events;
receiving a user input identifying displayed data to adjust the displaying of the multiple sets of events; and
adjusting the displaying of the multiple sets of events based on the user input.

9. The method as recited in claim 8, wherein the adjusting the displaying of the multiple events comprising sorting the multiple sets of events.

10. The method as recited in claim 8, wherein the adjusting the displaying of the multiple events comprising filtering the multiple sets of events.

11. A computing device, comprising:
one or more processors; and
a computer-readable storage medium having stored thereon multiple instructions that, responsive to execution by the one or more processors, cause the one or more processors to:
obtain data representing a behavior definition for a functional behavior of the computing device, the functional behavior definition including a set of multiple operations arranged in a sequence, each of the multiple operations including an operation identifier and one or more parameters, wherein one of the multiple operations includes a timing parameter indicating a threshold amount of time corresponding to executing the one of the multiple operations;
access data representing a log of events that occur in the computing device, the log of events individually including data representing multiple events each having an event identifier and one or more event parameters;
analyze the log of events to determine whether the sequence of the operations and the one or more parameters of each of the multiple operations of the behavior definition have been satisfied, including to:
match one of the multiple events to the one of the multiple operations based on the operation identifier and the event identifier;
determine whether the corresponding event parameter exceeds the threshold amount of time contained in the timing parameter of the one of the multiple operations; and
in response to determining that the sequence is satisfied and the corresponding event parameter exceeds the threshold amount of time contained in the timing parameter of the one of the multiple operations, transmitting, via a computer network, an electronic message to a user indicating that the functional behavior has occurred.

12. The computing device as recited in claim 11, each of the operations having been defined using a declarative language.

13. The computing device as recited in claim 11, the behavior definition further comprising an operation combination description that indicates how the multiple operations are combined in the behavior definition.

14. The computing device as recited in claim 11, the behavior definition further indicating a sequence in which the multiple operations are to occur.

15. The computing device as recited in claim 11, the multiple instructions further causing the one or more processors to:
analyze the log of events by identifying multiple sets of events in the log of events that satisfy the behavior definition;
display the multiple sets of events that satisfy the behavior definition, the displaying including displaying data for each event in each of the multiple sets of events;
receive a user input identifying displayed data to adjust the displaying of the multiple sets of events; and
adjust the displaying of the multiple sets of events based on the user input.

16. A method, comprising:
accessing data representing a log of events in the computing system, the log of events individually including data representing multiple events each having an event identifier and one or more event parameters;
performing analysis of the log of events based on data representing a behavior definition for a functional behavior of the computing system, the behavior definition including a set of multiple operations arranged in a preset sequence, each of the multiple operations including an operation identifier and one or more parameters, wherein one of the multiple operations includes a timing parameter indicating a threshold amount of time corresponding to executing the one of the multiple operations;
based on the performed analysis, determining whether the sequence of the operations and the one or more parameters of the individual operations of the behavior definition have been satisfied, including:
matching one of the multiple events to the one of the multiple operations based on the operation identifier and the event identifier; and
determining whether the corresponding event parameter exceeds the threshold amount of time contained in the timing parameter of the one of the multiple operations; and
in response to determining that the sequence is satisfied and the corresponding event parameter exceeds the threshold amount of time contained in the timing parameter of the one of the multiple operations, transmitting, via a computer network, an electronic message to a user indicating that the functional behavior has occurred.

17. The method as recited in claim 16, wherein the behavior definition further comprising an operation combination description that indicates how the multiple operations are combined in the behavior definition.

18. The method as recited in claim 17, wherein the operation combination description indicating a sequence in which the multiple operations are to occur.

19. The method as recited in claim 17, wherein the operation combination description indicating how the multiple operation parameters are to occur using combinatorial logic.

20. The method as recited in claim 16, wherein the one or more parameters of one operation of the multiple operations comprising a timing parameter indicating how long the one operation is to take, and the timing parameter being satisfied if the operation takes longer than the timing parameter indicates.

* * * * *